United States Patent [19]
Brainard, II

[11] 3,807,860
[45] Apr. 30, 1974

[54] METHOD AND APPARATUS FOR DETERMINING POLLUTION INDEX

[75] Inventor: Edward C. Brainard, II, Marion, Mass.

[73] Assignee: Environmental Devices Corporation, Marion, Mass.

[22] Filed: Jan. 31, 1973

[21] Appl. No.: 328,245

[52] U.S. Cl................ 356/72, 235/151.35, 356/73, 356/129
[51] Int. Cl...................... G01n 21/00, G01n 21/46
[58] Field of Search ................ 356/72, 73, 129, 96; 250/218; 235/151.35

[56] References Cited
UNITED STATES PATENTS

| 3,635,564 | 1/1972 | Zuckerman et al................. 356/128 |
| 3,609,324 | 9/1971 | Machler et al........................ 356/73 |
| 3,701,601 | 10/1972 | Plumpe, Jr. et al.................. 356/96 |
| 3,468,607 | 9/1969 | Sloane et al. ......................... 356/73 |
| 3,582,768 | 6/1971 | Watson................................. 356/72 |

Primary Examiner—Ronald L. Wibert
Assistant Examiner—V. P. McGraw
Attorney, Agent, or Firm—Kenway & Jenney

[57] ABSTRACT

A method and apparatus for providing an index of the concentration of pollutant in water determines the index according to the difference between two different measures of the salinity of the water. In a preferred embodiment the two measures of salinity are measures of electrical conductivity and of refractive index.

19 Claims, 3 Drawing Figures

METHOD AND APPARATUS FOR DETERMINING POLLUTION INDEX

BACKGROUND

This invention relates to a method and apparatus for providing an index of the amount of certain pollutants in water. Where the nature of the pollutant is known and its effect on salinity is established, the index identifies the concentration of the pollutant.

The invention provides the pollution index essentially instantaneously, and at the measuring site. Hence, it can provide a continuous, on-line monitor of pollution in a stream or body of water.

The invention is useful for example in monitoring the effluent from a sewerage plant, sugar mill, or pulp mill to ensure that the discharged organics are well below a specified limit, or to provide a continuous monitor of these pollutants.

In the prior art, organic pollutants in water are measured by techniques that sense the amount of oxygen which the organic matter consumes. One such technique in which one monitors the amount of oxygen the pollutant consumes in 5 days is referred to as the Five Day B.O.D. method. Another technique, referred to as the total organic carbon procedure, involves removing water fom the sample and then monitoring the amount of oxygen required to burn the residue. With a further technique, the water sample is saturated with air, after which the oxygen level is sensed to determine the rate at which the organisms in the sample consume it.

All of these known techniques for measuring pollutants in water are, as indicated, based on oxygen consumption. They are not suitable for on-line or real time use. Further, they do not lend themselves readily to continuous operation and instead are practiced on a batch basis.

Accordingly, it is an object of this invention to provide a method and apparatus for determining a measure of the pollution in water without the limitations of the prior art techniques, particularly those based on oxygen consumption.

Another object of the invention is to provide a method and apparatus of the above character which provide the desired pollution measure substantially instantaneously. The attainment of this object will make it possible readily to monitor and measure pollution on-line, and on a real time basis.

It is also an object of the invention to provide a method and apparatus of the above character which can be practiced with compact and readily portable equipment, which are reliable, and which are easy to use with a minimum of operator skill or experience.

It is a further object of the invention to provide a method and apparatus of the above character which can readily be practiced automatically.

SUMMARY OF THE INVENTION

The invention stems from the realization that certain different measures of the salinity of water provide different salinity values for the same water sample when the sample contains certain pollutants other than naturally occurring salts. It further has been found that the magnitude of the difference between the salinity measures, which is herein termed the pollution index, is directly related to the concentration of a given pollutant. Hence the measure of pollution index according to the invention provides a measure of the concentration of unknown pollutants and therefore can be used to signal changes in the pollutant level and changes in the nature of the pollutant. Further, the pollution index provided by the invention can readily be calibrated to identify the concentration of a given pollutant.

More particularly, sea, estuary and potable waters generally contain naturally occurring salt compositions, with varying degrees of salinity. It is known that measures of the refractive index of such salt-bearing water, and measures of its electrical conductivity, are responsive to the salinity of the water. In fact, charts and tables are available for converting both refractive index measures and conductivity measures to salinity concentrations; and where the water is pure except for the presence of naturally occurring salts, the charts provide essentially equal salinity values from the two measuring techniques.

The invention stems from the realization that many pollutants, particularly organic materials as are conventionally measured in terms of B.O.D. (biological oxygen demand), change the refractive index and the electrical conductivity of water differently; and from the further realization that this difference can provide, in turn, a measure of the concentration of such a pollutant. Hence, the measures of the refractive index and of the conductivity of water containing such pollutants identify different values of salinity on the standard tables of salinity for water which is pure except for naturally occurring salts. The difference between these salinity values, i.e., the pollution index, varies with the constitution of the pollutant, and with its concentration. Calibration tables and charts can readily be prepared for any given pollutant to directly relate the value of the measured pollution index to the corresponding concentration of that pollutant.

In a preferred embodiment, the practice of the invention accordingly involves measuring the electrical conductivity, the temperature and the refractive index of the pollution-bearing water. The measured conductivity and refractive index are converted to the corresponding salinity values, at the measured temperature, with the charts conventionally used for pollutant-free water containing only naturally occurring salts. The pollution index is then computed as the difference between the two salinity values. These measurements, conversions and computations can be made automatically and where desired can be made continuously in accordance with conventional data logging techniques.

The resultant pollution index reflects both the concentration and the constituent makeup of pollutants in the water being sampled. Where the nature of the pollutant is essentially invariant and known, as is typically the case, the pollution index can readily be converted to pollutant concentration in terms of B.O.D. or other units as desired, after initial calibration for the particular pollutant. Further, the pollution index as measured in accordance with the invention is relatively accurate.

In addition to practicing the invention by comparing values of salinity as determined by measurements of electrical conductivity and of refractive index, measurements of mass density can be used in lieu of measuring optical density by refractive index. Accordingly, the term "density-parameters" is used herein to refer collectively to these terms.

Also, the kind of pollutant which the method and apparatus of the invention will measure is herein referred to as a "differential pollutant." This term reflects the fact that the invention is useful with pollutants that affect electrical conductivity differently from a density-parameter. Differential pollutants typically are organic compounds, but can include inorganics. In general, they are materials that, when present in water, affect measures of its salinity in response to electrical conductivity and in response to a density-parameter differently.

Another phrase, "equivalent pollutant-free salinity" (and the foreshortened form "equivalent salinity") is used herein to designate the value of salinity for water free of nonsaline additives as determined from a measure of conductivity, or of a density-parameter, in water bearing a differential pollutant. That is, where the practice of the invention involves converting a measured value of conductivity, or of a density-parameter, to salinity, the resultant salinity value generally is not the actual salinity of the pollutant-bearing water being sampled. Rather, it is the salinity of pollutant-free saline water which would cause the given measured data.

The invention accordingly comprises the several steps and the relation of one or more of such steps with respect to each of the others, and the apparatus embodying the features of construction, combinations of elements and arrangements of parts adapted to effect such steps, all as exemplified in the following detailed disclosure; and the scope of the invention is indicated in the claims.

BRIEF DESCRIPTION OF DRAWINGS

For a fuller understanding of the nature and objects of the invention, reference should be made to the following detailed description and the accompanying drawings, in which:

FIG. 1 shows a pollution index instrument 10 according to the invention and which receives water to be measured at an input port 12 of a conduit 14. The conduit carries the water through a conductivity meter 16, a temperature sensor 18, and a refractometer 20. The water is then discharged from the instrument at port 22. The conductivity meter 16, temperature sensor 18 and refractometer 20 each can be constructed according to known techniques with conventional skills. The meter 16 typically has a conductivity cell exposed to the water in conduit 14 and connected with an electrical bridge that operates a digital output meter 16a to display the sensed value of conductivity. Similarly, the temperature sensor 18 has a sensing element exposed to the water in conduit 14 and has an output indicator, illustrated again as a digital meter 18a, on which it displays the measured value of water temperature. The illustrated refractometer 20 has an eyepiece 20a through which the operator can read the index of refraction of the water in conduit 14. Where the refractometer is a combined refractor/salinometer such as the Type 102 instrument available from the Instrument Division of Environmental Devices Corporation of Marion, Massachusetts, the internal scale viewed through the eyepiece 20a directly provides measured values of both index of refraction and salinity, and the latter reading is then corrected according to the water temperature as determined with the sensor 18.

Figure 1:
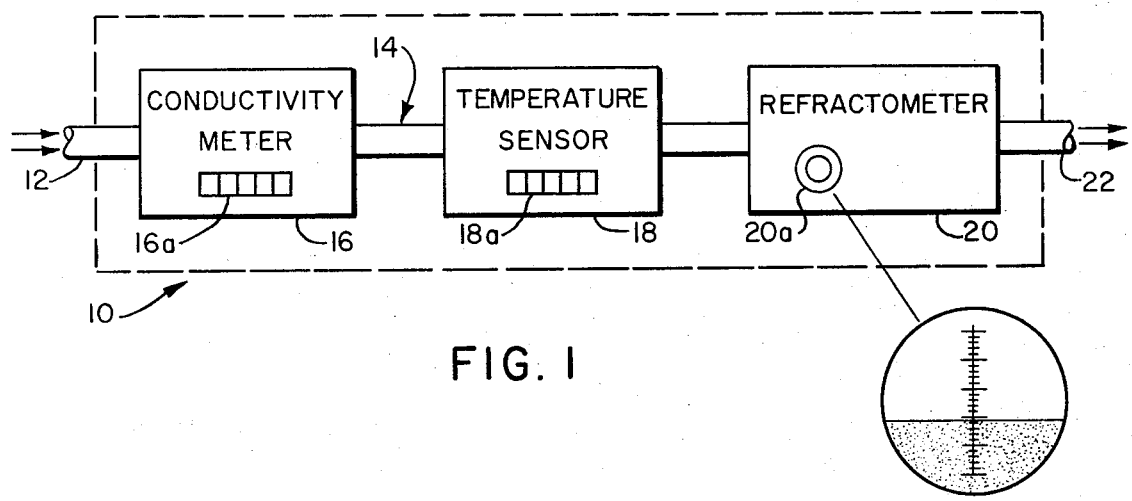
FIG. 1 is a block schematic representation of a pollution index instrument according to the invention.

In using the instrument 10, the measured values of conductivity, temperature, and refractive index, are converted to two values of equivalent pollutant-free salinity using standard salinity tables, one salinity value being determined from the measured conductivity and temperature and the other salinity value being determined from the measured refractive index and temperature. The arithmetic difference between these two equivalent salinity values, typically computed with the value of salinity determined by conductivity being subtracted from the salinity determined by refractive index, is the pollution index. Where the pollution index for the pollutant present in the water being monitored has once been calibrated in terms of pollutant concentrations, the computed value of pollution index will identify the actual concentration of the pollutant.

It should be understood that the sequence with which the components of the instrument 10 are arranged along the conduit 14 is not important. That is, the conductivity meter 16, the temperature sensor 18 and the refractometer 20 can be arranged in any sequence along the water-guiding conduit 14. It is, of course, desirable that they monitor the same water sample and with the water at essentially the same temperature. Otherwise separate temperature measures are required for the conductivity meter and for the refractometer. Where the pollution index meter is to operate on a batch or single point basis, the conduit 14 can be configured in the desired form of water vessel to contain the water sample.

Figure 2:
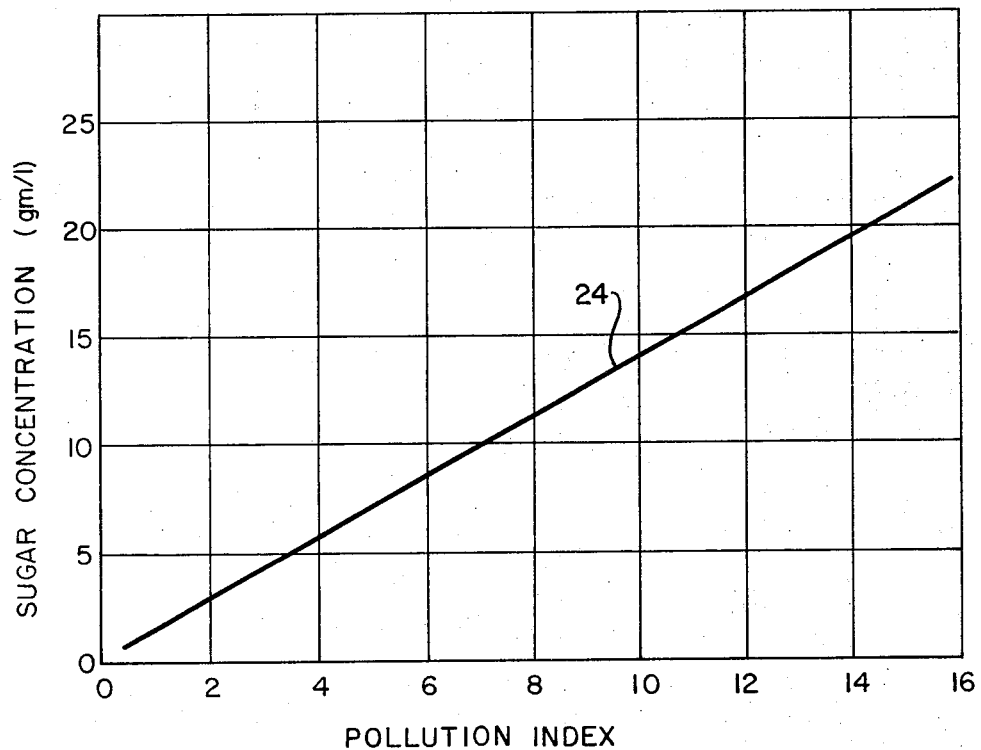
FIG. 2 is a graph illustrating the performance of the instrument of FIG. 1.

As an example of the practice of the invention, water having a known salt concentration was polluted by the addition of sugar, and the pollution index determined in the foregoing manner with the instrument of FIG. 1. The pollution index was found to change linearly from less than unity to around fourteen, as the sugar concentration was varied from one to twenty grams per liter. Moreover, the pollution index was found to be essentially independent of the water salinity over a range of zero to three grams Na Cl per liter of water. The graph of FIG. 2 shows with curve 24 the resultant unique and linear relation between pollution index and sugar concentration. The measurements can readily be made with an accuracy of 0.1 per cent.

Figure 3:
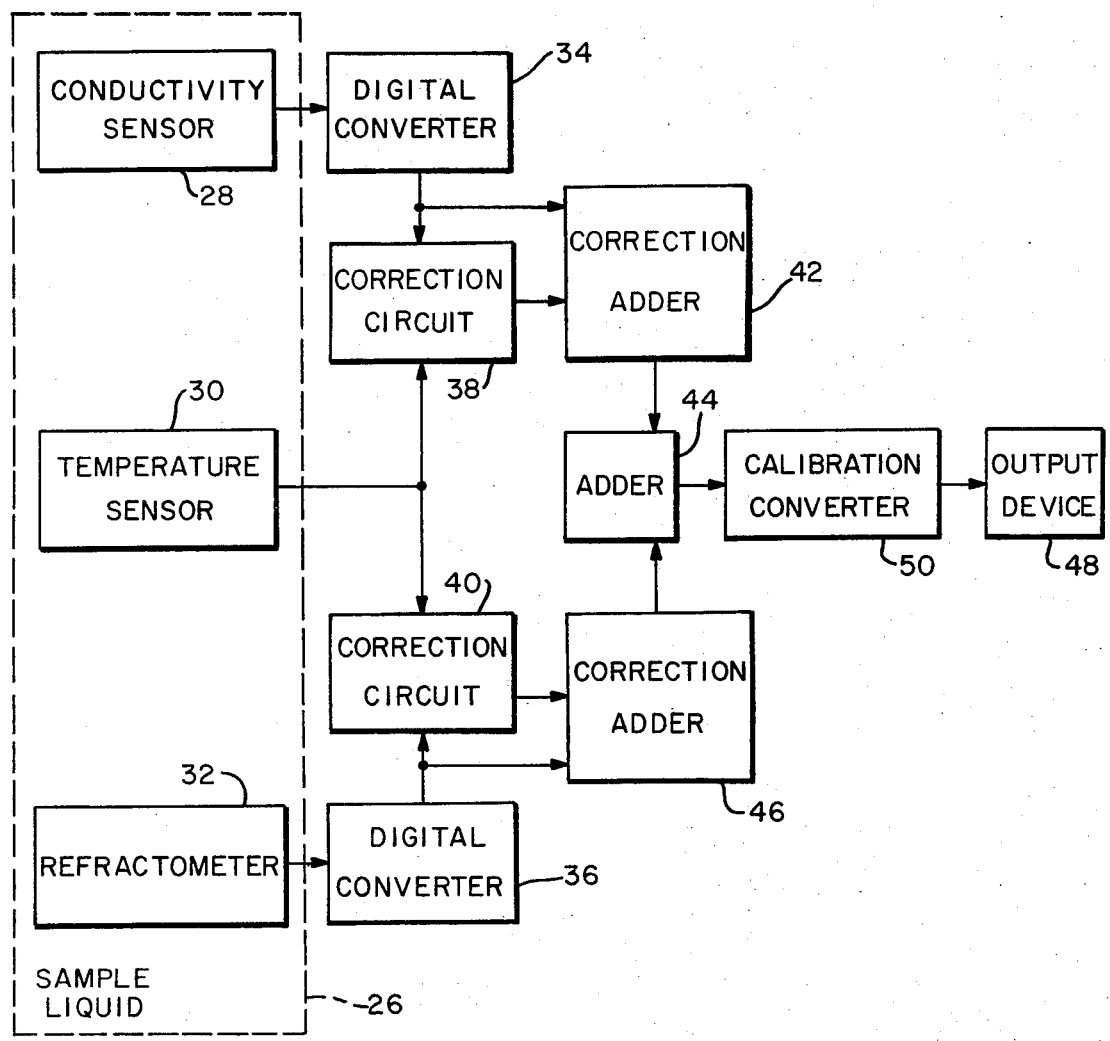
FIG. 3 is a block schematic representation of an automatic pollution index instrument according to the invention.

FIG. 3 shows an automated pollution index instrument in which water in a sample liquid vessel 26 is sensed by a conductivity sensor 28, a temperature sensor 30, and a refractometer 32. The conductivity sensor 28 produces a digital electrical signal responsive to the electrical conductivity of the water sample and applies it to a digital converter 34. This converter converts the conductivity signal to a first salinity-identifying signal according to a standard conversion table for the conductivity of pollutant-free saline water at 25 degrees centigrade, or another selected standard temperature. A second digital converter 36 receives from the refractometer 32 a similar digital signal responsive to the refractive index of the water sample, and produces a second salinity-identifying signal based on the standard conversion of refractive index to salinity for pollutant-free saline water, preferably at the same standard temperature as the first converter 34. The two converters 34 and 36 can, by way of illustrative example, be read-only memory devices storing successive values of equivalent salinity at successively-addressed locations. The devices access these locations in response to the input signal, i.e., in response to the conductivity signal in the case of converter 34 and in response to the refractive index signal in the case of the converter 36.

The automated instrument of FIG. 3 also has two correction circuits 38 and 40, each of which receives two input signals, one of which is the digital water temperature signal from temperature sensor 30. The other input signal to correction circuit 38 is the first salinity signal from converter 34. In response to these two signals, the correction circuit 38 generates a first correction signal corresponding to the correction required in the first salinity signal due to the temperature of the water sample being other than the standard temperature for which the converter 34 is programmed.

A first correction adder 42 receives this correction signal and the first salinity signal. The adder 42 produces a first corrected salinity signal in response to the arithmetic sum of its input signal and applies it to an adder 44. The other correction circuit 40 operates in a manner similar to circuit 38 in response to the temperature signal and second salinity signal (from converter 36) to produce the correction signal required to account for the difference between the actual water temperature in vessel 26 and the temperature at which the converter 36 is programmed. A second correction adder 46 responds to the arithmetic sum of the correction signal from circuit 40 and the second salinity signal from converter 36 to produce a second corrected salinity signal which it applies to adder 44.

The adder 44 sums the corrected signal from the adder 46 with the inverse of the corrected signal from adder 42 (i.e., subtracts the conductivity-responsive signal from the refractive index-responsive signal) to produce the desired pollution index signal at its output. This signal can be applied directly to an output device 48, or, as illustrated, can be applied first to a calibration converter 50 and the output of that device applied to the output device. The calibration converter, which can be constructed and operate similar to converters 34 and 36, converts the pollution index signal from adder 44 to the corresponding value of pollution concentration for the known pollution constituent in the water sample. The output device 48 can perform any one or more of several functions, including provide a visual display of the pollution index as determined in adder 44, provide a visible or other perceptible indication of pollution concentration as indentified by the output signal from converter 50, record either or both the pollution index and concentration signals, and produce alarms when either one or both of these measures exceed specified values.

The construction of the automated pollution index instrument as shown in FIG. 3 is illustrative of a variety of arrangements, both digital and analog as desired, that can be used. The instrument functions essentially as a special purpose digital computer and can in fact be constructed in this manner or even as a general purpose computer supplied with a program to provide the desired operation.

It will thus be seen that the objects set forth above, among those made apparent from the preceding description, are efficiently attained. Since certain changes may be made in carrying out the above method and in the construction set forth without departing from the scope of the invention, all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A method for providing an index responsive to differential pollutant in water, said method comprising the steps of
    A. determining the equivalent pollutant-free salinity of the water in response to the electrical conductivity and the temperature thereof,
    B. determining the equivalent pollutant-free salinity of the water in response to a density parameter and the temperature thereof, and
    C. determining said index in response to the arithmetic difference between said salinities.

2. A method as defined in claim 1 in which said step of determining salinity in response to a density parameter and the temperature comprises the steps of measuring the refractive index of the water and of measuring the temperature of the water.

3. A method as defined in claim 1 in which said salinity-determining steps include measuring the electrical conductivity, the temperature, and the density parameter of the same sample of water.

4. A method for providing an index of differential pollutant in water, said method comprising the steps of A. measuring the value of the electrical conductivity of the water,
    B. measuring the value of a density parameter of the water,
    C. converting said measures of conductivity and of density to measures of a single property of the water, and
    D. determining said index in response to the difference between said measures of said single property.

5. A method as defined in claim 4 in which said density parameter is selected from the group of parameters consisting of mass density and refractive index.

6. The method defined in claim 4 comprising the further steps of
    A. measuring the temperature of the water at which said measures of conductivity and of density-parameter are measured,
    B. determining a first equivalent pollutant-free salinity value of the water as identified by said measurements of conductivity and of temperature to provide one measure of said single property,
    C. determining a second equivalent pollutant-free salinity value of the water as identified by said measurements of density and of temperature, to provide a second measure of said single property, and
    D. computing said index as the arithmetic difference between said first and second salinity values.

7. The method defined in claim 6 further characterized in that said measured density parameter is refractive index.

8. A method for identifying the concentration of a differential pollutant in water, said method comprising the steps of
 A. measuring the value of the electrical conductivity of the water,
 B. measuring the value of a density parameter of the water selected from the group of parameters consisting of mass density, optical density and refractive index,
 C. measuring the temperature of the water at which said measures of conductivity and of density are made,
 D. converting said measures of conductivity and of density to measures of a single property of the water at said measured temperature or temperatures, as the case may be,
 E. determining an index of said pollution concentration in response to the difference between said measures of said single property, and
 F. converting said index to concentration of said pollutant from calibrated values of said index for said pollutant.

9. The method defined in claim 8 further characterized in that said density parameter is refractive index and said single property is a measure of salinity.

10. Apparatus for providing an index of differential pollutant in water, said apparatus comprising, in combination
 A. first means for determining the equivalent pollutant-free salinity of a sample of the water in response to the electrical conductivity and the temperature thereof,
 B. second means for determining the equivalent pollutant-free salinity of the same sample of the water in response to a density parameter and the temperature thereof, and
 C. means for determining said index in response to the arithmetic difference between said salinities.

11. Apparatus as defined in claim 10 in which said second determining means includes means for measuring refractive index of the water to provide said responce to a density parameter.

12. Apparatus as defined in claim 10 further comprising water-containing means for containing the sample of water for measurement by both said first and second determining means.

13. Apparatus for providing an index of differential pollutant in water comprising, in combination
 A. means for sensing the value of the electrical conductivity of the water,
 B. means for sensing the value of a density parameter of the water selected from the group of parameters consisting of mass density and refractive index,
 C. means connected with both said sensing means for converting each of said sensed conductivity and said sensed density parameter to a measure of a single property of the water, and
 D. arithmetic means for determining said index in response to the difference between said measures of said single property.

14. Apparatus as defined in claim 13
 A. further comprising means for sensing the temperature of the water,
 B. in which said converting means includes
  1. first means for determining a first equivalent pollutant-free salinity value of the water in response to sensed values of conductivity and of temperature to provide one measure of said single property, and
  2. second means for determining a second equivalent pollutant-free salinity value of the water in response to sensed measures of said density parameter and of temperature to provide a second measure of said single property, and
 C. in which said arithmetic means includes means for computing said index as the arithmetic difference between said first and said second salinity values.

15. Instrumentation apparatus for determining an index of differential pollutant in water, said apparatus comprising in combination
 A. means for containing a sample of the water,
 B. conductivity meter means arranged for measuring the value of the electrical conductivity of the water sample,
 C. temperature-sensing means arranged for measuring the value of the temperature of the water sample,
 D. means for measuring the value of a density parameter of the water sample selected from the group of parameters consisting of mass density and refractive index, and
 E. means for determining, from said measured values, the difference between a conductivity-responsive value of a selected property of the water and a density-responsive value of the same property.

16. Apparatus as defined in claim 15 wherein said means for measuring said density parameter comprises an optical refractometer.

17. Apparatus as defined in claim 15 in which said determining means includes
 A. first means connected with said conductivity meter means and said temperature-sensing means for determining a first value of salinity of the water in response to measured values of the conductivity and the temperature thereof,
 B. second means connected with said density measuring means and said temperature-sensing means for determining a second value of salinity of the water in response to measured values of said density parameter and the temperature thereof, and
 C. arithmetic means connected with said first and second salinity-determining means for determining said index in response to the arithmetic difference between said first and second values of salinity.

18. Apparatus as defined in claim 17 further comprising output means connected with said arithmetic means for manifesting the value of said index.

19. Apparatus as defined in claim 18 further comprising means connected with said arithmetic means for converting said determined value of said index to concentration of a selected pollutant.

* * * * *

UNITED STATES PATENT OFFICE
CERTIFICATE OF CORRECTION

Patent No. 3,807,860　　　　　　　　　　Dated April 30, 1974

Inventor(s) Edward C. Brainard, II

It is certified that error appears in the above-identified patent and that said Letters Patent are hereby corrected as shown below:

Column 7, line 47, before "sample" insert --same--.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents